(12) United States Patent  
Jibbe et al.

(10) Patent No.: US 9,182,918 B2  
(45) Date of Patent: Nov. 10, 2015

(54) NETWORK STORAGE SYSTEMS HAVING CLUSTERED RAIDS FOR IMPROVED REDUNDANCY AND LOAD BALANCING

(71) Applicant: NetApp, Inc., Sunnyvale, CA (US)

(72) Inventors: Mahmoud K. Jibbe, Wichita, KS (US); Abhishekh P. Sharma, Bangalore (IN); Karthik Krishnamurthy Satchitanand, Bangalore (IN); Venkata Ramprasad Darisa, Bangalore (IN); Dhishankar Sengupta, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/480,273

(22) Filed: Sep. 8, 2014

(65) Prior Publication Data

US 2015/0058559 A1 Feb. 26, 2015

Related U.S. Application Data

(63) Continuation of application No. 13/480,270, filed on May 24, 2012, now Pat. No. 8,832,372.

(51) Int. Cl.
*G06F 12/06* (2006.01)
*G06F 11/20* (2006.01)
*G06F 3/06* (2006.01)

(52) U.S. Cl.
CPC .............. *G06F 3/0619* (2013.01); *G06F 3/061* (2013.01); *G06F 3/065* (2013.01); *G06F 3/067* (2013.01); *G06F 3/0665* (2013.01); *G06F 3/0689* (2013.01); *G06F 11/2005* (2013.01); *G06F 12/0684* (2013.01)

(58) Field of Classification Search
CPC ..... G06F 3/0617; G06F 3/0646; G06F 3/067; G06F 11/16; G06F 11/1608; G06F 11/2002; G06F 11/2017; G06F 11/2005; G06F 11/2089; G06F 11/2092; G06F 12/0684
See application file for complete search history.

(56) References Cited

U.S. PATENT DOCUMENTS

| | | | |
|---|---|---|---|
| 6,067,545 A | 5/2000 | Wolff | |
| 6,948,102 B2 | 9/2005 | Smith | |
| 6,996,741 B1 | 2/2006 | Pittelkow et al. | |
| 7,111,189 B1 | 9/2006 | Sicola et al. | |
| 7,272,755 B2 | 9/2007 | Smith | |
| 7,603,507 B2 | 10/2009 | Yagi et al. | |
| 7,676,702 B2 | 3/2010 | Basham et al. | |
| 8,140,725 B2 | 3/2012 | Butler et al. | |
| 8,370,571 B2 | 2/2013 | Mazina | |
| 8,463,995 B2 | 6/2013 | Matsui et al. | |
| 2005/0028028 A1 | 2/2005 | Jibbe | |
| 2006/0242380 A1 | 10/2006 | Korgaonkar et al. | |
| 2011/0126041 A1 | 5/2011 | Matsubara | |
| 2011/0252270 A1* | 10/2011 | Abraham et al. | 714/4.1 |

* cited by examiner

*Primary Examiner* — Hal Schnee
(74) *Attorney, Agent, or Firm* — Haynes and Boone, LLP (57) ABSTRACT

A clustered network-based storage system includes a host server, multiple high availability system controller pairs, and multiple storage devices across multiple arrays. Two independent storage array subsystems each include a quorum drive copy and are each controlled by a HA pair, with remote volume mirroring links coupling the separate HA pairs. The host server includes a virtualization agent that identifies and prioritizes communication paths, and also determines capacity across all system nodes. A system storage management agent determines an overall storage profile across the system. The virtualization agent, storage management agent, quorum drive copies and remote volume mirroring link all operate to provide increased redundancy, load sharing, or both between the separate first and second arrays of storage devices.

18 Claims, 4 Drawing Sheets

NETWORK STORAGE SYSTEMS HAVING CLUSTERED RAIDS FOR IMPROVED REDUNDANCY AND LOAD BALANCING

PRIORITY

This application is a continuation of U.S. application Ser. No. 13/480,270, filed May 24, 2012, titled "Network Storage Systems Having Clustered Raids For Improved Redundancy and Load Balancing", the entire disclosure of which is hereby incorporated by reference in its entirety.

TECHNICAL FIELD

The present disclosure relates generally to network storage systems, and more particularly to improved redundancy and load balancing across such network storage systems.

BACKGROUND

Many arrays of storage devices deployed in storage area network ("SAN") environments have built-in redundancy and load balancing capabilities achieved by using a dual controller model. In many cases such storage devices can include at least one array of disks, which can be classified as a redundant array of independent disks ("RAID"). Under such dual controller model arrangements, where the controllers are often referred to as High Availability ("HA") pairs, individual controllers can be assigned to operate system nodes as primary controllers or "owners" of various volumes or groups of storage devices, with each such group having its own logical unit number ("LUN"). These controllers can also take over volumes of storage devices from their alternate or paired controllers in case of failures. A system host is often aware of both the preferred and the available secondary paths to a LUN, sometimes even acting as the agent forcing the failovers.

Unfortunately, the traditional use of HA pairs to control a given RAID does not tend to provide high levels of redundancy and load balancing across the greater system or network outside of a given HA pair and RAID. That is, while each given storage device array and controlling HA pair may have high levels of redundancy and load balancing therewithin based upon the inherent nature and design of such a subsystem, an overall network containing many such HA pair and storage array subsystems typically does not enjoy such levels of redundancy and load balancing thereacross. This can be an issue where such attributes are desirable over increasingly large data networks. In addition, there is often little to no recourse when an entire array subsystem (i.e., both controllers in an HA pair) goes down within an overall larger network. As such, the ability to have constant access to and even disaster recovery of certain high priority data files across a large data network of many HA pair subsystems may also be desirable in some instances.

Although many network storage systems, devices and methods have generally worked well in the past, there is always a desire for improvement. In particular, what is desired are network storage systems and methods that are able to provide high levels of redundancy and load balancing across individual array subsystems, particularly with respect to high priority data that might otherwise be unavailable when an entire array subsystem fails.

SUMMARY

It is an advantage of the present disclosure to provide improved storage area networks and methods therefor that have high levels of redundancy and load balancing across individual storage array subsystems. Such improved devices and methods preferably are able to apply a cluster based model across storage array subsystems having at least two independent RAIDs or other arrays of storage devices to form a single clustered system, such that failover and load balancing between separate independent arrays are possible. In particular, such a single clustered system can make use of one or more remote volume mirroring links between controllers of the separate independent arrays, as well as intelligent system structuring and monitoring schemes that utilize predictive failure analysis to result in improved data communication techniques and also critical data recovery in the event that an entire array subsystem fails.

In various embodiments of the present invention, a clustered network-based storage system can include a host server, a plurality of storage devices, and a plurality of high availability system controller pairs. The host server can be adapted to transmit and receive data across the system, and can include a virtualization agent and a storage management agent thereon. The virtualization agent can facilitate the identification of clustered system communication paths and determinations of capacity across multiple clustered system nodes. The storage management agent can facilitate the determination of an overall storage profile across the clustered system. The plurality of storage devices can be adapted to store data transmitted from the host server, and can be arranged in separate independent arrays including at least first and second arrays of storage devices. Each such array can include a quorum drive copy containing information about the overall storage profile of the clustered system. Each of the plurality of high availability system controller pairs can include first and second controllers that are each adapted for designation as a clustered system node and for reading and writing to at least some of the plurality of storage devices based upon commands received from the host server. Each of the first and second controllers in each controller pair can be in communication with each other, the host server, a respectively assigned array of storage devices from the plurality of storage devices, and a corresponding controller in a different high availability controller pair via a remote volume mirroring link. The virtualization agent, storage management agent, quorum drive copies and remote volume mirroring link all operate to provide increased redundancy, load sharing, or both between the separate first and second arrays of storage devices.

In various further embodiments, a first network-based storage system controller adapted to operate as a high availability paired controller in a clustered network-based storage environment can include a number of modules thereon. A first module on such a first system controller can be adapted to facilitate the operation of a first system node that controls the reading and writing to each of a first plurality of storage devices arranged within a first array of storage devices based upon commands received from a separate host server. Such commands can be from a virtualization agent on the host server that facilitates the identification of clustered system communication paths and facilitates determinations of capacity across multiple clustered system nodes. A second module can be adapted to facilitate interactions with a separate second system controller set in a first high availability pair arrangement with said first system controller, with the separate second controller operating a second system node that controls the reading and writing to each of a second plurality of storage devices arranged within said first array of storage device based upon commands received from the separate host server.

A third module can be adapted to facilitate interactions across a remote volume mirroring link with a separate third system controller set in a separate second high availability pair arrangement with a separate fourth system controller, wherein the separate third system controller operates a third system node that controls the reading and writing to each of a third plurality of storage devices arranged within a separate second array of storage devices based upon commands received from the separate host server. In particular, the third module can facilitate system redundancies, load sharing, or both between the first and second high availability controller pairs over the remote volume mirroring link.

In still further embodiments, various methods of operating a clustered network-based storage system are provided. Such methods can include the initial process steps of providing or detecting the existence of at least four separate system controllers as individual system nodes coupled to a host server, wherein the arrangement of the at least four separate system controllers includes at least two separate high availability controller pairs, as well as creating setup volumes of storage devices associated with each of the individual system nodes, wherein the arrangement of the storage devices includes at least a first array of storage devices controlled directly by a first high availability controller pair and a second separate independent array of storage devices controlled directly by a second high availability controller pair. Further process steps can include establishing a plurality of remote volume mirroring links between controllers in the first and second high availability controller pairs, wherein each remote volume mirroring linked controller is adapted to control indirectly a separate array of storage devices via a remote volume mirroring link, exchanging metadata between the individual system nodes, wherein the metadata includes information regarding the organization of the clustered network-based storage system, and identifying at least four different communication paths from the host server to each of the storage devices, wherein each of the at least four different communication paths travels through at least one individual system node. Still further process steps can include determining an aggregated capacity of all storage devices on the clustered network-based storage system, and creating an overall storage profile for the clustered network-based storage system, said overall storage profile including controller to storage device ownership properties and communication path priorities. Again, the virtualization agent, storage management agent, quorum drive copies and remote volume mirroring link can operate to provide increased redundancy, load sharing, or both between the separate first and second arrays of storage devices.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive devices, systems and methods involving improved redundancy and load balancing across clustered storage networks. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

The present invention relates in various embodiments to devices, systems and methods involving storage area networks having clustered arrays of RAIDs or other storage devices. The disclosed embodiments can involve network attached storage, as will be readily appreciated. In various particular embodiments, the disclosed devices, systems or methods can apply a cluster-based model to traditional storage arrays, such as by grouping multiple independent storage arrays together to form a single clustered system with at least one remote volume mirroring link between them serving as a "heartbeat" type connection. This solution allows for failover between separate and independent storage arrays or subsystems when needed, as well as more flexibility to share and modify ownership or control of LUNs when needed. This can be accomplished via the remote volume mirroring link(s), as well as by system agents or modules employing intelligent monitoring schemes that utilize predictive failure analysis and improved input-output ("IO") shipping methods.

Among other benefits of the disclosed clustered storage area network, redundancy is achieved across storage array subsystems by leveraging the power of remote volume mirroring links between controllers in different storage array subsystems. Further, the host is allowed multiple additional communication paths to each LUN or other storage target beyond the traditional number of paths. In addition, the specialized virtualization and storage management agents or modules include an investigative predictive failure analysis model that ensures very high reliability in the preservation and accessibility of system data. This can be accomplished by backing up data and facilitating data access via alternate paths even before actual node failure occurs, thereby reducing risks of unexpected dual-controller failures. Each array can include a quorum drive copy containing information about the overall storage profile of the clustered system, whereby such information can be available in the event that a given file or entire array having a quorum drive copy is out or otherwise not available. In addition, various disclosed embodiments include a unique mutual disaster recovery mechanism, whereby at least a single large volume on each subsystem array holds critical data that is primarily stored on another subsystem array.

While the numerous examples provided focus on particular aspects of RAIDs and disk based arrays, it will be understood that the various principles and embodiments disclosed herein can be applied to other storage devices, applications and arrangements as well. For example, similar host, controller and remote volume mirroring arrangements can be used with respect to solid state storage components and other storage devices beyond disks.

Figure 1:
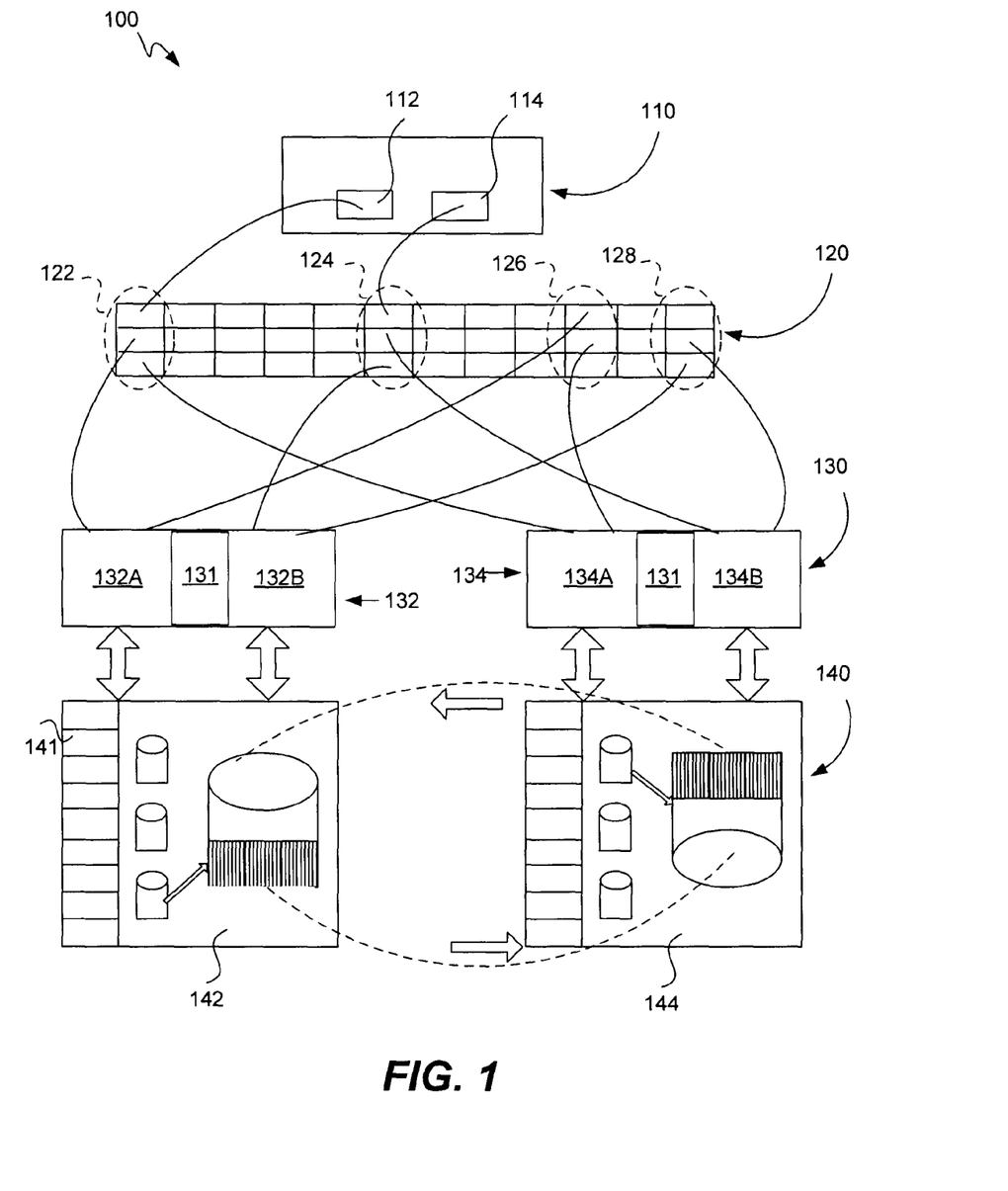
FIG. 1 illustrates in block diagram format an exemplary clustered network-based storage system having a plurality of independent storage device arrays according to one embodiment of the present invention.

Turning first to FIG. 1, an exemplary clustered network-based storage system having a plurality of independent storage device arrays is illustrated in block diagram format. Clustered network-based storage system or SAN 100 can include at least a server 110, one or more switches 120, a plurality of controllers 130 and a plurality of independent RAIDs or other storage device arrays 140. Each controller 132A, 132B, 134A, 134B in both of the RAID arrays can be considered an individual clustered system node, and it will be readily appreciated that a given "node" can be taken over by or replaced by another controller or appropriate device in suitable circumstances. Each controller 132A, 132B, 134A, 134B is linked in HA pair fashion to an alternate controller within its same subsystem via a traditional inter-controller communication channel ("ICC") or channels 131, which arise to a "local heartbeat" between controllers. Each controller 132A, 132B, 134A, 134B is also linked to a corresponding controller in the separate or remote subsystem via a remote volume mirroring link, which arises to a "remote heartbeat" between controllers of different subsystems.

For example, controller 132A is linked to controller 132B as a first HA pair of controllers 132 that controls or "owns" a first subsystem or array 142 of individual disks or storage devices 141. Conversely, controller 134A is linked to controller 134B as a second HA pair of controllers 134 that controls or "owns" a second and separate independent subsystem or array 144 of individual disks or storage devices. By way of remote volume mirroring links, controller 132A is also linked to controller 134A through switch zone 126, and controller 132B is also linked to controller 134B through switch zone 128. Under such an arrangement, controller 132A is able to control indirectly storage volumes in second array 144 by way of controller 134A, and vice versa—that is, controller 134A is able to control indirectly storage volumes in first array 142 by way of controller 132A. Similarly, controller 132B is able to control storage volumes in second array 144 by way of controller 134B, and vice versa.

As will be readily appreciated, such links can be observed by how the various controllers 130 interact with one or more switches 120 between the host 110 and the controllers or nodes. While controller 132A interacts with zone 122 on switch 120, linked controller 134A can also be monitoring this interaction at this zone by way of its remote volume mirroring link with controller 132A through switch zone 126. Similarly, controller 132A can monitor switch zone 122 by way of its remote volume mirroring link with controller 134A through switch zone 126 while controller 134A interacts in ordinary fashion with host 110 by way of switch zone 122. Similar arrangements can be seen with respect to switch zone 124 and interactions therewith by remote volume mirroring linked controllers 132B and 134B.

In various embodiments, a host or virtualization agent or module 112 can reside and run on the host or server 110. Such a virtualization agent 112 can be responsible for a number of activities, such as aggregation of capacity reported by individual nodes. This can advantageously result in the elimination of duplicate capacity reported by both controllers of the same HA pair, for example. Other duties that can be performed by the virtualization agent can include the recognition of communication paths from the server to each individual storage device or LUN.

Each node or controller 132A, 132B, 134A, 134B maintains separate metadata that is shared across the nodes, and this metadata can be established, updated and otherwise maintained through the use of a storage management agent or module 114 that runs on the client and decides an overall storage profile. Although shown as being on the host or server 110, such a storage management agent or module 114 can actually be located within firmware on one or more controllers 130. Such storage management agent(s) or module(s) can be responsible for activities such as partition creation, disk or LUN ownership assignment and path priority schema, checkpoints for use by one or more predictive failure analysis modules, IO shipping conditions, and metadata management, among other possible actions.

Since SAN 100 is a clustered system that is preferably able to provide redundancies and full backup across separate independent subsystems, both of storage arrays 142, 144 preferably have equal or similar capacities, with the capacity usage pattern mirrored across the two separate arrays. Where two separate arrays are used in the SAN, preferably only about fifty percent of available capacity should be used for local storage purposes on a given array, while the remaining storage capacity is reserved for providing space to recreate and rebuild storage from the mirrored storage array in the event that the mirrored array ever fails.

Due to the predictive failure analysis nature of some of the modules provided herein, as described in greater detail below, it is not necessary always to backup storage arrays 142 and 144 to each other at all times. Such constant backup duplication can be costly in terms of time and system wear, among other issues. Rather, the capacity for such a process can merely be reserved on each subsystem storage array 142, 144, such that backup can take place as warranted.

Also, it will be readily appreciated that the number of clustered subsystems in overall SAN 100 is not necessarily limited to two. Three or even more clustered subsystems can be combined into an overall SAN having similar remote volume mirroring links coupling separate HA controller pairs, as well as separate quorum drives and virtualization and storage management agents. Such overall storage networks having three or more clustered subsystems can similarly realize increased redundancies and load balancing across subsystems.

Although a wide variety of applications involving methods of and sub-processes for operating a clustered network-based storage system can be envisioned, several basic methods and approaches are provided here as examples and for purposes of illustration. It will be readily appreciated that the overall approach and various sub-processes can vary as may be desired for a given application, such that some steps or features need not be performed in all instances. In addition, various other steps and features not disclosed or elaborated upon herein may also be added.

Figure 2:
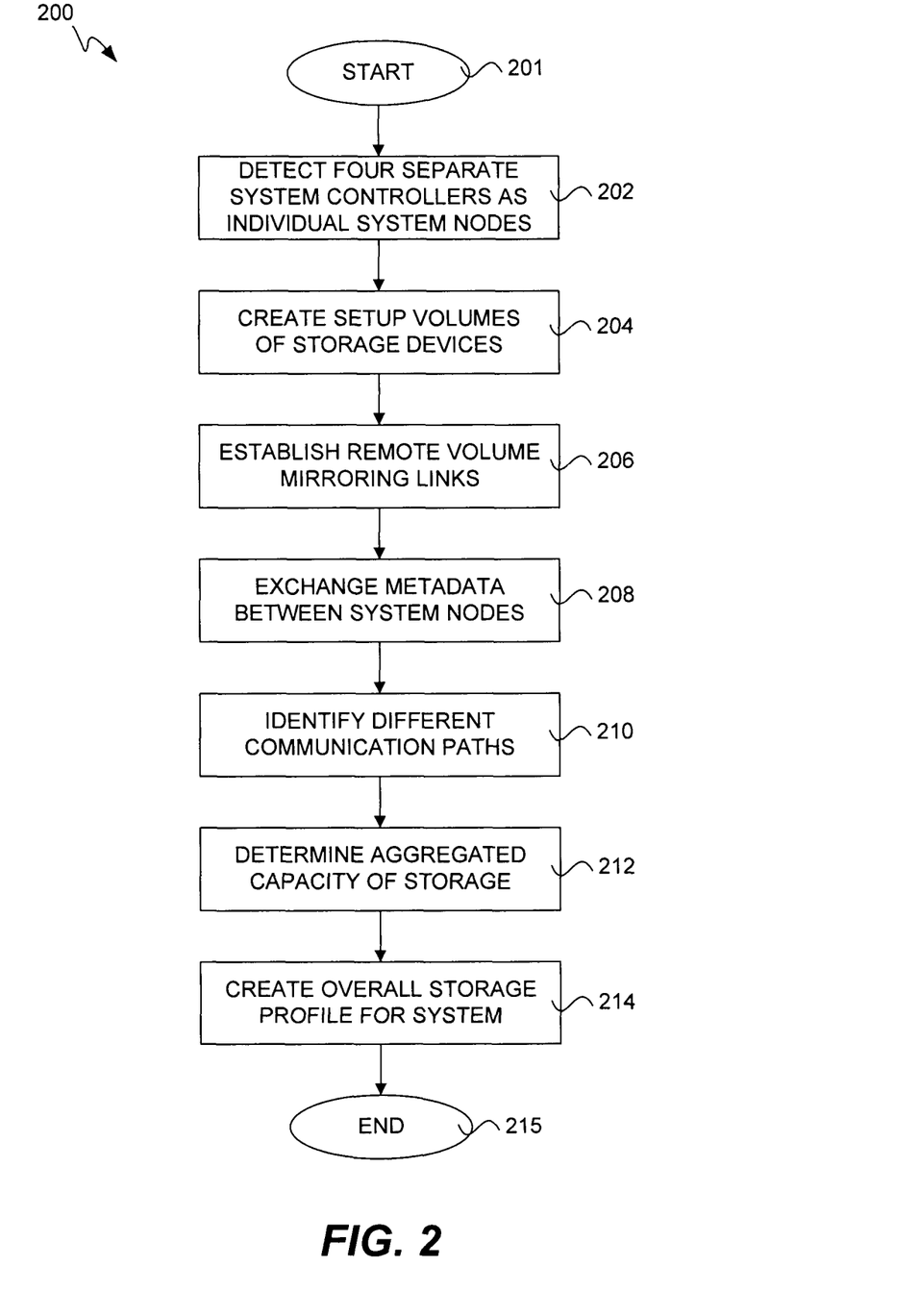
FIG. 2 provides a flowchart of an exemplary method of operating a clustered network-based storage system involving the setup thereof according to one embodiment of the present invention.

Turning next to FIG. 2, a flowchart of an exemplary method 200 of operating a clustered network-based storage system involving the setup thereof is provided. In particular, such a method can involve using or operating a clustered SAN system, such as any of the various network servers, switches, controllers, storage devices and other components described above. It will be readily appreciated that not every method step set forth in this flowchart is always necessary, and that further steps not set forth herein may also be included. Furthermore, the exact order of steps may be altered as desired for various applications. For example, steps 210 and 212 may be reversed or performed in parallel in some embodiments.

Beginning with a start step 201, a first process step 202 involves detecting the existence of at least four separate system controllers as individual system nodes coupled to a host server. Again, such an arrangement of at least four separate system controllers includes at least two separate high availability controller pairs, as set forth in detail above. Each controller of either array comes up as an individual clustered system node, recognizes the host agent that is attached to it and reports the total capacity owned by it.

At a subsequent process step 204, setup volumes of storage devices associated with each of the individual system nodes are created. In particular, the arrangement of the storage devices includes at least a first array of storage devices controlled directly by a first high availability controller pair and a second separate independent array of storage devices controlled directly by a second high availability controller pair, as detailed above. A default setup volume that stores the metadata of each node is automatically created at bring up. None of the nodes is the sole owner of this setup volume, and the setup volume is automatically updated on any changes to any of the nodes.

Following or during the setup creation of step 204, a plurality of remote volume mirroring links between controllers in the first and second high availability controller pairs is established at process step 206. Again, each remote volume mirroring linked controller is adapted to control indirectly a separate array of storage devices via a remote volume mirroring link. Such remote volume mirroring connections reflect a "remote heartbeat," and can be manually instantiated in some cases. At subsequent process step 208, metadata between the individual system nodes is exchanged. Such metadata can include information regarding the organization of the clustered network-based storage system. Among other items, metadata may or may not include partition creation information, disk or LUN ownership assignment information and path priority schema, checkpoints for use by one or more predictive failure analysis modules, and/or IO shipping conditions and data.

At a following process step 210, at least four different communication paths from the host server to each of the storage devices are identified, with each of the different communication paths traveling through at least one individual system node or controller. In various embodiments, the host or virtualization agent attached identifies the paths that are present. The host or server is preferably provided with at least four independent and different communication paths to a target LUN. As will be readily appreciated each of the different paths goes through a different controller upon leaving the host. The actual path switching can be regulated or predetermined by a path priority schema that is defined as part of a storage profile.

At process step 212, an aggregated capacity of the storage devices on the clustered network-based storage system is determined. This can be accomplished where the host or virtualization agent examines and evaluates the storage capacity reported by each of the controller nodes, and comes up with the aggregated capacity. This process can involve elimination of duplicate capacities, such as might be reported by two HA paired controller nodes within the same array subsystem.

Process step 214 then involves creating an overall storage profile for the clustered network-based storage system. Such an overall storage profile can include a number of items, such as controller to storage device ownership properties and communication path priorities, among other possibilities. Such a creation can be performed by a storage management agent in some arrangements, such as where the aggregated capacity calculated by the host or virtualization agent in step 212 is then provided to a storage management agent. The storage management agent can also then create LUNs with required attributes, such as RAID level, capacity, cache profile, properties for scrubbing and other error or defect detection, and the like.

The storage management agent can also establish the ownerships as well as the path priorities for the created LUNs. For example, an individual node can be assigned as the owner of a LUN, with the path to the owning node being considered the preferred path for IO. In addition to the preferred path, each LUN can also have attributed thereto various alternate paths, which can be categorized as primary, secondary and tertiary alternate paths. Again, each separate array can include its own quorum drive copy that contains information about the overall storage profile of the clustered system. After the storage management agent finishes its activities, the setup portion of the method then ends at an end step 215.

As noted above, path priority schemas and predictive failure analysis capabilities provide enhanced features for the disclosed SAN systems. In case of a failover or failure of a controller node, the host IO can adapt by utilizing the primary alternate path for that node, the unavailability of which can force the host to use the secondary alternate path, or even the tertiary alternate path. Again, these available paths are defined by the storage management agent as part of its profile definition. Ideally, the path to the alternate controller node within the same subsystem can be the primary alternate path, while the corresponding controller in the remote or separate subsystem array can be the secondary alternate path.

Referring back to FIG. 1, an illustrative example will now be provided. In the event that controller 132A is the owning controller, then the path through zone 122 and controller 132A can be considered the preferred path, while the path through zone 124 via controller 132B, ICC 131, and controller 132A can be considered the primary alternate path. Further, the secondary alternative path can be considered the path through zone 126 via controller 134A to controller 132A, while the tertiary alternative path can be considered the path through zone 128 via controller 134B, controller 132B, ICC 131 and controller 132A.

"Failovers" in the clustered SAN systems disclosed herein can be of two basic types. A first type of failover can be similar to the traditional legacy failover mechanism with respect to a single failover within an HA pair. This would involve the other controller taking over full duties over the primary alternate paths for its failed controller partner within the same subsystem, with a subsequent failback process once the partner controller resumes, as is generally known. The second type of failover in the systems disclosed herein is a unique method that is achieved by using a predictive failure analysis mechanism. Such predictive failure analysis can be performed by one or more specialized programs or modules, which may be contained on the storage management agent or module.

It will be readily appreciated that situations that demand usage of the secondary or tertiary alternate communication paths (i.e., redundant storage array) tend to involve cases where the complete primary node (i.e., owning storage array) is expected to go down. Such instances will also tend to result in the loss of the remote volume mirroring connection(s). As such, recovering from failure to the secondary or tertiary alternate paths can be achieved using a specialized predictive failure analysis ("PFA") model whereby resources are copied or rebuilt from a primary subsystem array to the partnered redundant subsystem array. Again, this can be accomplished using the reserved space on the redundant system that has been set aside for specifically this purpose.

Copying or rebuilding can be accomplished using the heartbeat remote volume mirroring link(s), prior to the primary node going down as anticipated. Subsequent IO operations to the target storage unit, which is then on a different storage subsystem, can be redirected appropriately. The various conditions or checkpoints for the PFA modules can be defined as part of the overall storage profile for the system to be maintained by the storage management agent. Such conditions or parameters can involve aspects such as IO response time, check conditions reported from original targets, and channel quality, among other vital stats collected within the system controllers. These changes can also result in redefining path priorities, such as where either the secondary and tertiary alternate paths can become the new preferred and primary alternate paths for a given storage target.

In various embodiments, the server or host can be oblivious to this physical storage realignment or recreation of a LUN on different physical storage when it occurs, such that the host simply views these events as just ordinary path switching. In such embodiments, the actual realignment and mapping processes can be performed on the backend to ensure that no data corruptions occur during host IO, and as such can be taken care of by the appropriate controller firmware modules. In this regard, the storage management agent or module(s) can be located at the controller node level, such as in controller firmware as well.

Failback under such circumstances occurs when either a single system controller or both HA paired controllers of the primary storage array eventually come back up with optimal conditions, or are found to satisfy the checkpoints or conditions of an appropriate PFA module for optimal standards. At such a time, the nodes are deemed optimal and worthy of ownership again, such that failback can take place. The host then experiences a path switch, and a re-sync process happens in the backend between the role-reversed physical volume copy and the original source volume via the reinstated remote heartbeat link (i.e., remote volume mirroring) to ensure that the latest updated information in available and installed to the original subsystem storage.

In some embodiments, a permanent ownership change that is not subjected to failback restrictions can take place within array subsystems, and/or can also occur via ordinary IO shipping procedures. Such instances can occur when the alternate path is used to route IO for a period longer than a specific threshold defined in the storage profile, either due to the lack of availability of the preferred path or as part of a load balancing solution. Under such cases, the alternate controller in an HA pair can be made the primary owner of the LUNs using its path.

In general, a typical IO cycle under optimal conditions, subjected to local failover and remote failover cases, can be initiated by receipt of an IO request from the server or host via a preferred path. If the preferred path is available, then the host IO request is serviced normally and uneventfully. During this process, the service parameters are closely monitored against the checkpoints or standards of the PFA module(s). If the service parameters are not meeting the PFA standards as set in the storage profile, however, then further actions are taken. This can involve the LUNs being rebuilt in the reserved storage space of the alternate subsystem with the same volume parameters, as well as an internal context switch where the controller maps the new data locations in the alternate subsystem physical storage with that of the older locations. This ensures that the physical addresses referred to by the host IO requests for older locations are internally redirected to the corresponding new physical addresses. As noted above, the host can continue to remain unaffected by the internal realignment process that is performed at the controller level. The host IO quiescence is lifted next and IO servicing resumes over the new alternate paths. This process is explained in greater detail with respect to the next flowchart below.

Figure 3:
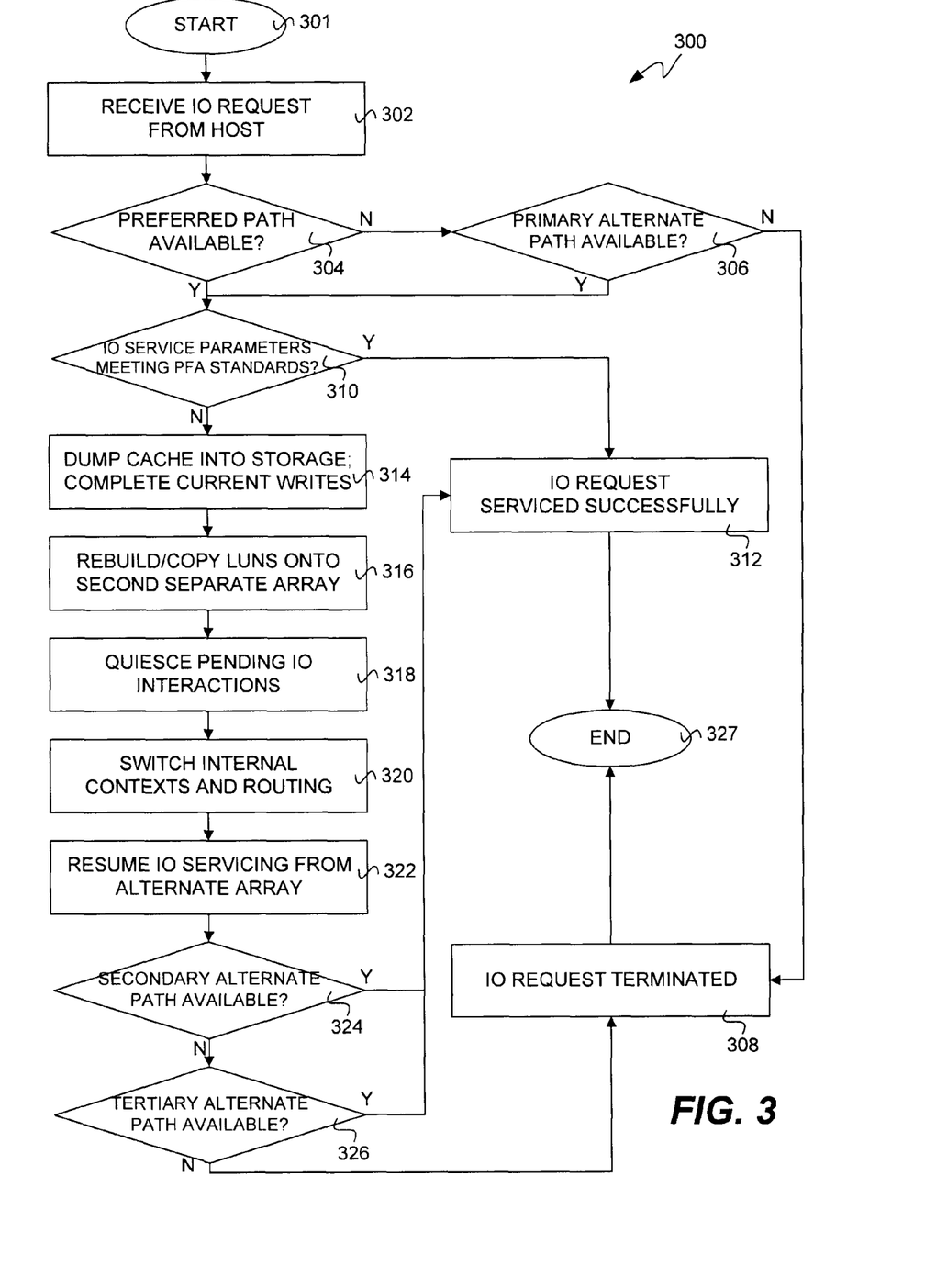
FIG. 3 provides a flowchart of an exemplary method of operating a clustered network-based storage system involving processing a write request and performing predictive failure analysis thereon according to one embodiment of the present invention.

Moving now to FIG. 3, a flowchart of an exemplary method 300 of operating a clustered network-based storage system involving processing a write request and performing predictive failure analysis thereon is provided. Again, this method can involve using or operating a clustered SAN system, such as any of the various network servers, switches, controllers, storage devices and other components described above, and it will be understood that not every step set forth here is always necessary, and that further steps not set forth herein may also be included. For example, one or more process steps that involve establishing predictive failure analysis standards with respect to communications across each of the individual system nodes can be provided. Furthermore, the IO request processing and PFA of this provided method can be performed in addition to and as a supplement of the setup based method previously set forth with respect to FIG. 2 above.

Beginning with a start step 301, a first process step 302 involves receiving a write request or other IO interaction from the host server. Again, such a request can involve a network arrangement including a host and at least four separate system controllers that include at least two separate high availability controller pairs, as set forth in detail above. At a subsequent decision step 304, an inquiry is made as to whether the preferred path for the IO request is available for service. If not, then the method continues to decision step 306, where a subsequent inquiry is made as to whether the primary alternate path is available. If that too is unavailable, then the particular write request or IO interaction is terminated at process step 308. Such an unsuccessful IO servicing can optionally generate an error message, alert or other alternative action (not shown), and then results in the method ending at end step 327.

If either the preferred or primary alternate communication paths are available, however, then the method moves to decision step 310, where an inquiry is made as to whether the current IO service communication parameters are meeting previously established predictive failure analysis standards. Although not shown, establishing predictive failure analysis standards with respect to communications across each of the individual system nodes can also be included as a process step prior to this point. If the current parameters are meeting or exceeding the PFA standards, then the IO request is serviced successfully at process step 312. It is anticipated that this should be the outcome for many IO interactions.

In the event that the current IO service parameters are not meeting the PFA standards, however, then the method moves to process step 314, where a copy or rebuild procedure in anticipation of a failover begins. That is, steps 314 through 322 effectively represent backing up the first array of storage devices onto the second separate array of storage devices over the remote volume mirroring link(s) and then continuing operations on the second subsystem in response to the current communication parameters fail to meet or exceed the predictive failure analysis standards. Process step 314 involves dumping cache data into disks and completing current in-flight writes to LUNs as may be appropriate. At subsequent process step 316, LUNs on the first array where imminent failure is anticipated are copied or rebuilt onto the second separate array. Pending IO writes or interactions are quiesced or otherwise halted or paused at process step 318, after which the internal contexts and routing for the subsystems are switched at process step 320. This involves a backend storage realignment and mapping process, whereby communication path designations are changed, such that the paths into the second alternate subsystem are recognized as the preferred paths. IO servicing is then resumed from the second subsystem at process step 322.

As a final check on resumption of IO servicing from the alternate subsystem, a subsequent inquiry is made at decision step 324 as to whether the secondary alternate path is available. This secondary alternate path is effectively the preferred path of the alternate subsystem. If the secondary alternate path is not available, then the method continues to decision step 326, where an inquiry is made as to whether the tertiary alternate path is available. Similarly, the original tertiary alternate path is effectively the primary alternate path for the second or alternate subsystem. If neither the secondary nor the tertiary alternate paths are available at steps 324 or 326, then the particular write request or IO interaction is terminated at process step 308. Again, an unsuccessful IO servicing at step 308 can optionally generate an error message, alert or other alternative action (not shown), which then results in the method ending at end step 327. In the event that the secondary or tertiary alternate path is available at step 324 or 326, however, then the method continues to process step 312, where the IO interaction is serviced successfully. The method then ends at end step 327.

One potential concern from the foregoing processes might involve the physical LUN rebuilt as a result of the failover caused by the IO service parameters not meeting PFA module-checkpoints resulting in a delayed IO quiescence period, thereby impacting performance of the system. This can be mitigated by speeding up and prioritizing the LUN rebuild process by utilizing maximum processor resources in both arrays, as may be desired.

Another benefit that can be realized by the disclosed SAN systems is that of disaster recovery in the event of a sudden complete loss of an entire subsystem. In fact, total site loss or dual node failure situations in an array subsystem cannot always be predetermined by intelligent monitoring schemes such as predictive failure analysis. As such, planned failover or physical realignment of storage resources may not always be good solutions, even though such measures can often be highly effective in increasing the overall redundancy profile of the storage system. Because there could be sudden and unpredicted losses of a complete site due to mechanical problems, natural disasters, sabotage or the like, the ordinary turnaround time to replace or recover from such instances can often be very high and impact application performance. As such, additional measures are preferred for such cases.

A disaster recovery solution can be included with one or more of the foregoing clustered storage array models. In such embodiments, critical or otherwise more important data identified to be of higher priority can be stored in designated "preferred" volumes on each subsystem storage array. Content from these preferred volumes can be regularly copied over internally to one or more large volumes that are engaged in bidirectional synchronous mirror relations with their equivalent volumes on the alternate subsystem storage array(s). Such preferred volumes can be relatively large, such as on the order of one or more terabytes.

To achieve the bidirectional mirror capability within the preferred volumes, a logical demarcation point can be specified in these volumes. Such a logical demarcation point can ensure that bidirectional synchronization does not lead to unwanted data overwrite. For example, if both preferred volumes are 2 terabytes each, then 0-1 terabytes can be defined as the write space for the preferred volume in the primary array, and 0-1 terabytes of the preferred volume in the secondary array will be the respective read-only mirror region. Similarly, 0-1 terabytes can be the write-space in the preferred volume of the secondary array, with a corresponding mirror region in the primary array. In the event of an unpredicted and sudden full site loss for an entire subsystem, then critical data can be restored and read by the host without much downtime via the alternate subsystem storage array.

Figure 4:
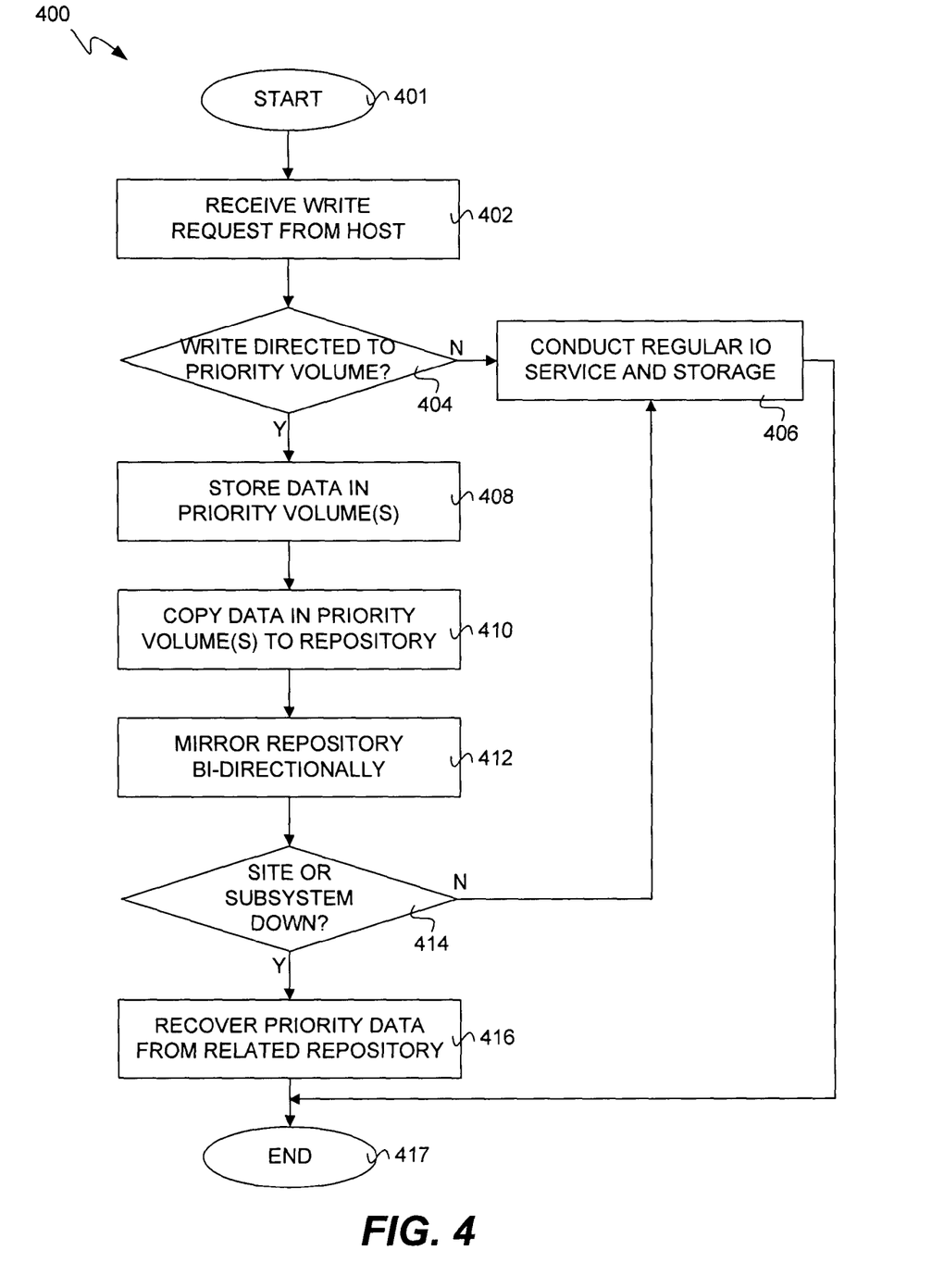
FIG. 4 provides a flowchart of an exemplary method of operating a clustered network-based storage system involving processing a priority write request and performing disaster recovery backup measures thereon according to one embodiment of the present invention.

Turning lastly to FIG. 4, a flowchart of an exemplary method 400 of operating a clustered network-based storage system involving processing a priority write request and performing disaster recovery backup measures thereon is provided. As in the foregoing embodiments, this method can involve using or operating a clustered SAN system, such as any of the various network servers, switches, controllers, storage devices and other components described above, and it will be understood that not every step set forth here is always necessary, and that further steps not set forth herein may also be included. Furthermore, the disaster recovery backup measures of this provided method can be performed in addition to and as a supplement of the setup and IO processing methods set forth above in FIGS. 2 and 3.

Beginning with a start step 401, a first process step 402 can involve receiving a write request or other IO interaction from the host server. A subsequent decision step 404 then inquires as to whether the write request or other IO action is directed toward a priority volume. Such a decision 404 can be incumbent upon first establishing priority storage standards and storage devices with respect to the regular and priority storage of data clustered network-based storage system, which can be subject to a previous process step (not shown) in some embodiments.

If the write request or other IO interaction is not directed to a priority volume, then regular IO service and data storage procedures are followed at subsequent process step 406, with ordinary processing to follow and the method then ending at end step 417. If a priority volume is implicated at decision step 404, such as when the write request is determined to meet the established standards for the priority storage of data, then the method moves to process step 408. The write request is then performed and the data is stored in one or more priority volumes at step 408.

At a following process step 410, the data in the priority volumes is internally copied to a critical data repository, after which bidirectional mirroring of the critical data repository takes place at process step 412. This effectively results in copying the contents of the priority volume storage device to a backup storage device on the alternate or secondary array over one or more of the remote volume mirroring links. At this point, the critical data is located both at its primary designated location, and also on the priority volume at the alternate subsystem storage array. At the next decision step 414, an inquiry is made as to whether one of the full sites or subsystems is down. If not, then ordinary IO service and procedures continue at process step 406. In the event that one of the sites is down, however, then priority data can be recovered from the critical data repository on the priority volume at the alternate subsystem at process step 416. The method then ends at end step 417.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A first storage controller comprising:
    a first module adapted to facilitate reading and writing to each of a first plurality of storage devices in a first array of storage devices based upon first commands received from a host server, said first commands including a first non-backup write request including data for storage on the first plurality of storage devices;
    a second module adapted to facilitate interactions with a second storage controller in a first high availability pair arrangement with the first storage controller, wherein the second storage controller controls the reading and writing to each of a second plurality of storage devices in the first array of storage devices;
    a third module adapted to receive a second non-backup write request from the host server through a third storage controller over a volume mirroring link, the second non-backup write request including data for storage on the first plurality of storage devices; and
    a fourth module adapted to receive, from the second storage controller over an inter-controller communication channel, a third non-backup write request including data for storage on the first plurality of storage devices;
    wherein the third storage controller is part of a second high availability pair arrangement with a fourth storage controller, the second high availability pair managing a second array of storage devices.

2. The first storage controller of claim 1, further comprising a fifth module adapted to receive, from the third storage controller over the volume mirroring link, a backup write request including data from the second array of storage devices for storage on the first array of storage devices.

3. The first storage controller of claim 1, further comprising a fifth module adapted to transmit, to the third storage controller over the volume mirroring link, a backup write request including data from the first array of storage devices for storage on the second array of storage devices.

4. The first storage controller of claim 1, further comprising a fifth module adapted to receive, from the host server, a fourth non-backup write request including data for storage on the second array of storage devices and forward the fourth non-backup write request to the third storage controller over the volume mirroring link.

5. The first storage controller of claim 1, further comprising a fifth module adapted to receive, from the host server, a fourth non-backup write request including data for storage on the second plurality of storage devices and forward the fourth non-backup write request to the second storage controller over the inter-controller communication channel.

6. The first storage controller of claim 1, further comprising a fifth module adapted to exchange metadata with the host server to determine communications paths between the host server and the first storage controller.

7. The first storage controller of claim 1, further comprising a fifth module adapted to exchange metadata with the host server regarding storage capacity of the first plurality of storage devices.

8. The first storage controller of claim 1, wherein a capacity of the first array of storage devices is substantially equal to a capacity of the second array of storage devices.

9. The first storage controller of claim 8, wherein the first storage controller is configured to reserve a first portion of the capacity of the first array of storage devices for local storage purposes and a second portion of its capacity for backing up the second array of storage devices.

10. A method of operating a first storage controller, the method comprising:
    managing the storage of data in a first plurality of storage devices in a first array of storage devices based upon commands received from a host server;
    forming a first high availability pair arrangement with a second storage controller, the second storage controller managing the storage of data in a second plurality of storage devices in the first array of storage devices;
    receiving, from the host server, a first non-backup write request including first data for storage on the first plurality of storage devices;
    storing the first data on the first plurality of storage devices;
    receiving, from the host server, a second non-backup write request including second data for storage on the first plurality of storage devices, the second non-backup write request being received from a third storage controller over a volume mirroring link, the third storage controller being part of a second high availability pair arrangement with a fourth storage controller, the second high availability pair managing a second array of storage devices;
    storing the second data on the first plurality of storage devices;
    receiving, from the host server, a third non-backup write request including third data for storage on the first plurality of storage devices, the third non-backup write request being received from the second storage controller over an inter-controller communication channel; and
    storing the third data on the first plurality of storage devices.

11. The method of claim 10, further comprising;
    receiving, from the third storage controller over the volume mirroring link, a backup write request including fourth data from the second array of storage devices; and
    storing the fourth data on the first array of storage devices.

12. The method of claim 10, further comprising transmitting, to the third storage controller over the volume mirroring link, a backup write request including fourth data from the first array of storage devices for storage on the second array of storage devices.

13. The method of claim 10, further comprising:
    receiving, from the host server, a fourth non-backup write request including fourth data for storage on the second array of storage devices; and
    forwarding the fourth non-backup write request to the third storage controller over the volume mirroring link.

14. The method of claim 10, further comprising:
receiving, from the host server, a fourth non-backup write request including fourth data for storage on the second plurality of storage devices; and
forwarding the fourth non-backup write request to the second storage controller over the inter-controller communication channel.

15. The method of claim 10, further comprising exchanging metadata with the host server to determine communications paths between the host server and the first storage controller.

16. The method of claim 10, further comprising exchanging metadata with the host server regarding storage capacity of the first plurality of storage devices.

17. The method of claim 10, further comprising reserving a first portion of the capacity of the first array of storage devices for local storage purposes and a second portion of the capacity for backing up the second array of storage devices.

18. The method of claim 10, further comprising:
receiving a storage profile for a clustered storage system from the host server; and
storing the storage profile in a quorum drive from the first plurality of storage devices.

\* \* \* \* \*